Aug. 17, 1926.
C. O. GUERNSEY
OILING SYSTEM FOR CRANK SHAFTS
Filed Nov. 19, 1924
1,596,828
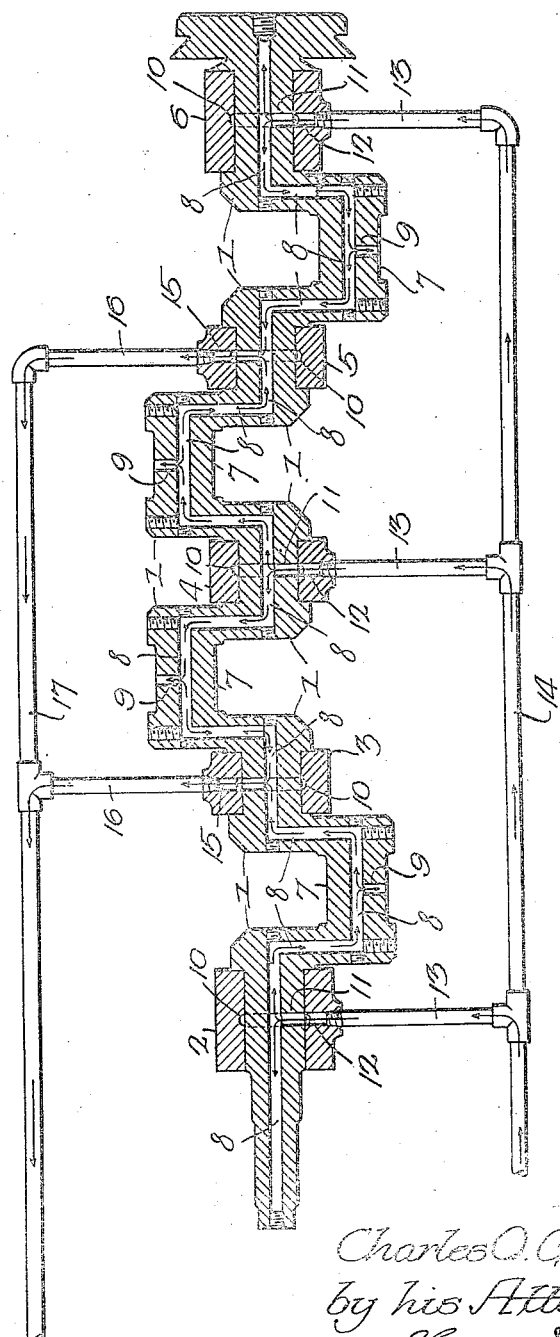
Inventor
Charles O. Guernsey.
by his Attorneys, Patented Aug. 17, 1926.

1,596,828

UNITED STATES PATENT OFFICE.

CHARLES O. GUERNSEY, OF PHILADELPHIA, PENNSYLVANIA.

OILING SYSTEM FOR CRANK SHAFTS.

Application filed November 19, 1924. Serial No. 750,849.

The object of this invention is to improve the method of lubricating multiple-throw crank shafts, such as used in multiple cylinder combustion engines, air compressors, and similar devices, so as to lubricate all of the bearings thoroughly.

In the accompanying drawing:

The figure is a longitudinal sectional view of a crank shaft and its bearings, showing the system of lubrication.

Referring to the drawing, 1 is the crank shaft of a multiple cylinder internal combustion engine, which is used, in the present instance, as the motor of a vehicle. The crank shaft has a plurality of main bearings, and as illustrated there are five such bearings marked 2, 3, 4, 5 and 6 respectively. The shaft has a plurality of cranks and ordinarily when there are five bearings there are four cranks as illustrated, these cranks being designated by 7, 7. The crank shaft has a passage 8, which extends throughout or substantially throughout its length. Plugged passages are provided at the points shown to facilitate the forming of the main passage 8. At each crank 7 is a short passage 9, which communicates with the interior passage 8 and extends to the surface so as to lubricate the bearing of the connecting rod, which encircles the crank. Each of the bearings 2, 3, 4, 5 and 6 has a groove 10. The crank shaft has short passages 11, which form a communication between the grooves and the interior passage 8 of the crank shaft. In the bearings 2, 4 and 6 are short passages 12, which communicate with the grooves 10 in said bearings. Each of these bearings is supplied with lubricant from a pipe 13 that is connected to a main supply pipe 14, which is connected to a pressure pump so that oil, or other lubricant, under pressure, is forced into the three bearings 2, 4 and 6. The lubricant flows into the main passage 8 through the short passages 11. The bearings 3 and 5 have passages 15, which communicate with the annular grooves 10 and with pipes 16 that communicate with an outlet pipe 17. The lubricant, after it has passed through all of the ramifications in the crank shaft, escapes through the pipes 16 to the outlet pipe 17. The lubricant can be cleansed and re-circulated, if desired.

The outlet pipe 17 is preferably connected to a relief valve, which can be set to any desired pressure within the capacity of the pump.

By this arrangement, the oil in the bearings is kept under pressure at all times.

It will be noted that should one of the supply lines become clogged, lubricant from the other supply lines will work through the crank shaft to lubricate the bearings of the clogged section.

It will also be noted that there is a continuous flow through every portion of the crank shaft. This flow tends to cool the crank shaft and assists in carrying any dirt, or sediment, rather than deposit it in the bearings.

It will be understood that this system can be applied to crank shafts having more than four cranks without departing from the essential features of the invention.

The outlet can be arranged at any convenient point to circulate the lubricant properly throughout the crank shaft.

I claim:

1. The combination of a crank shaft having at least four cranks; at least five bearings for the shaft, said shaft having a continuous lubricant passage that extends substantially from one end thereof to the other; and communicates with the main bearing surfaces thereof; a supply pipe for lubricant under pressure, said supply pipe communicating with alternate bearings; and an outlet pipe communicating with the remaining intervening bearings, whereby lubricant, under pressure, is caused to flow throughout the shaft and through each bearing.

2. The combination of a multiple-throw crank shaft having a longitudinal lubricating passage that extends substantially from one end of the crank shaft to the other and communicates with the main bearing surfaces thereof and also communicates with the bearing surfaces of the cranks; a series of main bearings for the crank shaft; an inlet pipe for supplying lubricant under pressure, said pipe being connected to certain of said main bearings; and an outlet pipe communicating with other main bearings so that the lubricant, under pressure, will flow throughout the crank shaft and its bearings.

CHARLES O. GUERNSEY.